No. 842,596. PATENTED JAN. 29, 1907.
P. S. WARD.
DOUGH DIVIDING MACHINE.
APPLICATION FILED NOV. 8, 1906.

3 SHEETS—SHEET 1.

Witnesses
C. M. Fahnestock
Glena Pritchard

Inventor
Paul S. Ward
by Alfred M. Allen
Attorney

No. 842,596. PATENTED JAN. 29, 1907.
P. S. WARD.
DOUGH DIVIDING MACHINE.
APPLICATION FILED NOV. 8, 1906.

3 SHEETS—SHEET 2.

Witnesses
C. M. Fahnestock
Glena Pritchard

Inventor
Paul S. Ward
Alfred M. Allen
Attorney

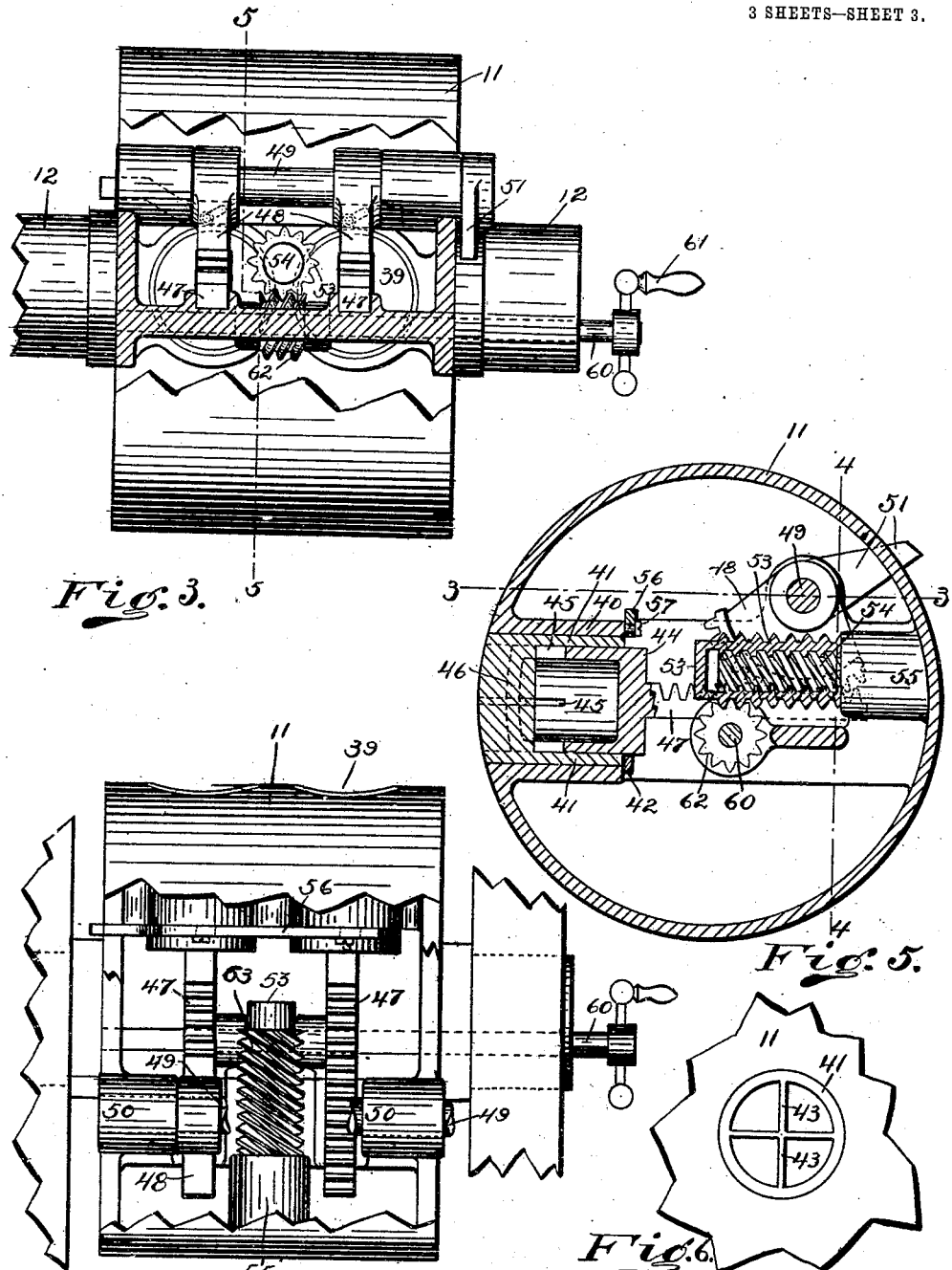

UNITED STATES PATENT OFFICE.

PAUL S. WARD, OF COVINGTON, KENTUCKY, ASSIGNOR TO THE SUPERIOR TOOL AND SUPPLY COMPANY, OF CINCINNATI, OHIO, A CORPORATION OF OHIO.

DOUGH-DIVIDING MACHINE.

No. 842,596.      Specification of Letters Patent.      Patented Jan. 29, 1907.

Application filed November 8, 1906. Serial No. 342,560.

*To all whom it may concern:*

Be it known that I, PAUL S. WARD, a citizen of the United States, residing in Covington, county of Kenton, and State of Kentucky, have invented certain new and useful Improvements in Dough-Dividing Machines, of which the following is a full, clear, and exact description, reference being had to the accompanying drawings, forming part of this specification.

My invention relates to machines for dividing masses of dough and other plastic materials into portions of uniform weight and density; and the purpose of my invention is to provide an effective device for automatically controlling the movement of the operating-plunger to obtain uniform pressure on the mass as it is delivered to the measuring-receptacle and, further, to provide simple and effective mechanism for varying the capacity of the measuring-receptacle to meet the requirements of any particular mass of dough and the desired weight of portions.

The invention consists of that certain novel construction and arrangement of parts to be hereinafter particularly pointed out and claimed.

Figure 1:
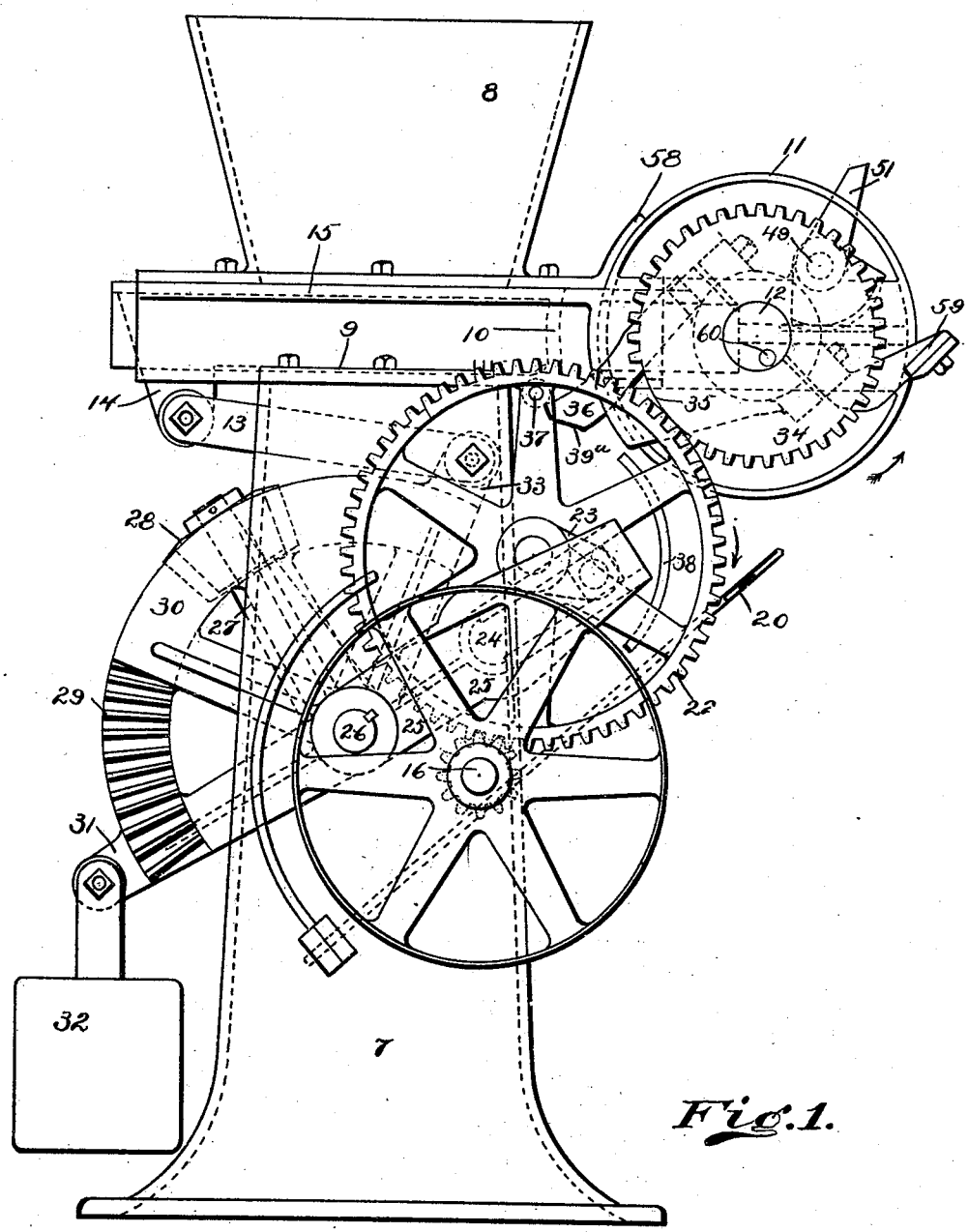
Figure 2:
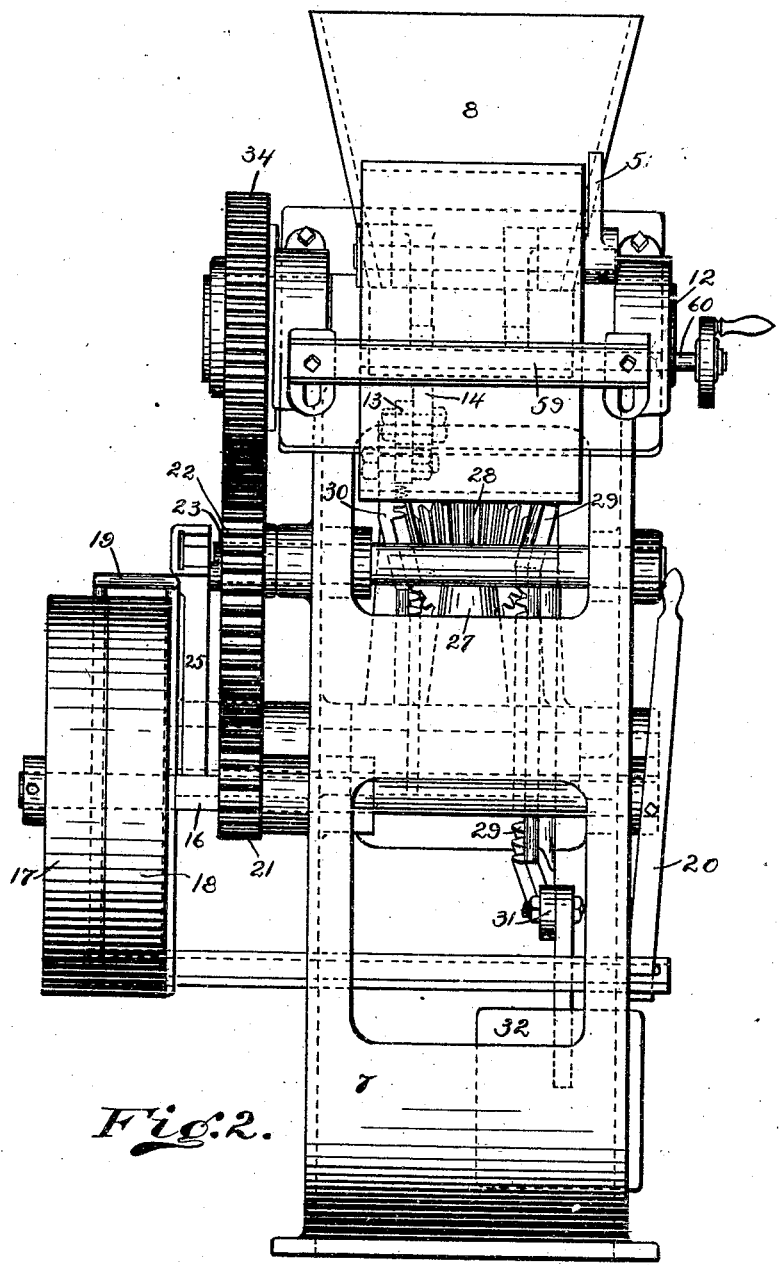

In the drawings, Figure 1 is a side elevation of my improved machine. Fig. 2 is a front elevation of same. Fig. 3 is a front elevation of the measuring-receptacle, partly in vertical section. Fig. 4 is a plan view of the measuring-receptacle with the cylindrical casing broken away. Fig. 5 is a central cross-section of same, taken on the lines 5 5 of Fig. 3. Fig. 6 is a detail front view of a portion of the measuring-receptacle, showing the dividing-partitions.

7 is the solid and substantial framework of the machine, in which the operating parts are mounted and upon which is secured the hopper 8, opening into a rectangular box or channel 9, in which is reciprocated the head or plunger 10 for forcing the dough into the compartments provided in the cylindrical measuring-receptacle 11, which is journaled on trunnions 12 in the front portion of the framework. The plunger 10 is reciprocated by means of the connecting-rod 13, coupled to the rear depending lug 14 at the rear end of the plunger-frame. This plunger-frame is connected at front and rear by the plate 15, (indicated in dotted lines in Fig. 1,) which slides in suitable guides in the frame, so as to open and close the bottom of the hopper as the plunger-frame is reciprocated.

16 is the main driving-shaft of the machine, provided with the tight and loose pulleys 17 18, the belt being shifted by the belt-shifter 19, actuated by the hand-lever 20. The main driving-shaft 16 carries the pinion 21, which meshes with the gear 22, which carries the crank 23. The crank-pin of this crank 23 engages the slot 24 in the lever 25, which is mounted on and keyed to the shaft 26, suitably journaled across the machine. This shaft 26 also carries the lever or arm 27, keyed thereto, upon the outer end of which is loosely mounted the pinion 28. This pinion engages on opposite sides the segment racks or gears 29 and 30, which segments are loosely mounted on the shaft 26. Upon the lug 31 on the segment-gear 29 is suspended the heavy weight 32, while the opposite segment-gear is coupled by the lug 33 to the connecting-rod 13, which thus connects the segment-gear 30 with the plunger-frame.

The driving-shaft 16 is so rotated that the gear 22 will always rotate in the direction of the arrow in Fig. 1, or clockwise, and as this gear 22 rotates the crank 23 will rock, through the medium of the lever 25, the rock-shaft 26, which in turn will rock the arm 27, and as the segment-gear 29 is held down by the weight 32 this movement of the arm 27 will cause the pinion 28 to rock the segment-gear 30 to the left, as shown in Fig. 1, from the position that the segment-gear occupies at the end of the forward stroke of the plunger. This movement will carry the plunger 10 back to its starting-point on the left of the hopper. The plunger and its frame is arranged to fit snugly in the frame of the machine, and the forward end of the framework fitting snugly against the cylindrical surface of the measuring-receptacle 11 the back movement of the plunger creates a suction, which causes the dough in the hopper 8 to drop down in front of the plunger. The further rotation of the gear 22 rocks the arm 27, carrying the pinion in the opposite direction, or to the right, as shown in Fig. 1, and this carries the plunger 10 forward, delivering the dough into the measuring-receptacle. As soon as the plunger has forced the dough into the receptacle and compressed same the plunger necessarily stops, the arm 27 continuing its rocking movement. Inasmuch as the segment-gear 30 is stopped, the pinion 28 will then act on the segment-gear 29, and the weight 32 will be raised the necessary amount to allow the arm 27 to complete its throw. The amount of this movement of the arm 27 will of course depend on the position in which the plunger 10 may have been stopped, depending on the amount of the dough in front of the plunger; but the pressure on this dough will be regulated by the weight 32, so that a uniform pressure will always be obtained by reason of the compensating-gear construction for exerting this pressure, which has just been described.

The measuring-receptacle comprises a cylindrical casing 11, with trunnions 12, by which it is journaled in the framework so as to rotate, and this rotation is obtained by the gear 34, bolted onto one end of the cylinder, which gear meshes with the main gear 22.

In order that the measuring-receptacle may remain stationary during the loading operation, a certain number of gear-teeth on the gear 34 are removed, as shown at 35, and bolted to the gear is the dog 36. This dog 36 extends in front of the pin 37 on the gear 22, so that at the proper time the pin 37 comes into contact with the dog 36 and throws the gear 34 into mesh with the gear 22, and with it the cylindrical measuring-receptacle is rotated a complete revolution. In order to prevent the gear 34 from overrunning as it completes its revolution, a segmental stop 38 is formed on the gear 22, and the segmental edge 39ª of the dog 36 comes in contact with the outer surface of this stop.

The cylindrical measuring-receptacle is provided with as many compartments for the receipt of the dough as desired for the width of the receptacle. In the present instance two of these receptacles are provided. The cylinder 11 is hollow and formed with cylindrical recesses 39 39, with the walls 40 a part of the cylinder. These two recesses are provided with identical dough-receiving mechanism, and only one will therefore be described. Seated in the tubular chamber 40 is the open tube 41, provided with a flange 42 on its inner edge to prevent the tube being pushed out of the recess. This tube is provided with the partitions 43, which are thin plates crossing at the center, the purpose of the partitions being to subdivide the dough into four equal parts when desired, the dough entering each receptacle. Seated within the tube 41 is the plunger 44, which is provided with the slots 45 to straddle the partitions 43 43. With the exception of these slots the front face of this plunger, as indicated by the dotted lines 46 in Fig. 5, is solid and made to conform to the surface of the cylinder 11. Extending back from the rear of the plunger 44 is the rack 47, which engages the segment-gear 48, mounted on the rock-shaft 49, journaled in suitable bosses 50 on the side faces of the cylinder 11. This rock-shaft 49 carries the dog 51, keyed thereto, which dog is mounted outside the cylinder with its outer end extending above the surface of the cylinder when the plunger 44 is within the recess.

The dough is pushed into the recesses in the measuring-receptacle by the plunger 10, which pushes back the plunger 44 until it comes in contact with the head 52 of the nut 53, which is interiorly threaded on the screw 54, mounted on the boss 55 on the inner surface of the cylinder 11, and it is evident that by regulating the position of the nut 53 the movement of the plunger 44 will be regulated and the size of the recess into which the dough is forced controlled. When it is desired to cut the dough which is forced into the recess into smaller portions, the tube 41, carrying the cutting-partitions 43, is locked in the position shown in Fig. 5 by the locking-bar 56. This locking-bar is secured by screws 57 to the cylindrical walls 40, and these screws pass through diagonal slots in the bar 56, and the bar is held in its upper position by spring-pressure. The end of this locking-bar extends through a slot in the frame, as shown in Fig. 4, so that it can be operated from the outside, and when it is desired to subdivide the dough the bar can be pulled down in front of the tube 41, which will prevent the tube being pushed back by the dough into the recess. When it is not desired to divide the dough into smaller portions, this locking-bar is raised, as shown in Fig. 5, and the pressure of the dough will force back the tube 41 and the entire recess will be filled, the front face 46 of the plunger 44 being pressed back until it is stopped by the nut 53, and this same nut will also serve as a stop for the tube 41.

The dough is forced into the receptacles under the pressure of the weight 32, as hereinbefore described, and then, as described, the gear 34 is thrown into mesh with the gear 22, and the cylinder 11 is rotated until the dog 51 comes in contact with the plate 58, mounted on the framework, which extends across the face of the cylinder, and the dog is forced back flush with the cylinder underneath the plate 58. This movement of the dog rocks the segment-gear 48, which is in mesh with the rack 47 on the plunger 44, and the dough in the receptacle is discharged therefrom onto a table or any suitable receptacle. After the discharge of the dough in order to keep the cylinder clean of any particles of dough a scraper-bar 59 is provided, secured across the face of the cylinder to properly scrape same. Upon the completion of the rotation of the cylinder the plunger 10 in pushing a new supply of dough into the receptacle again forces back the plunger 44, and the dog 51 is again rocked into its upright position.

It will be evident from the foregoing description that the position of the nut 53 will regulate the depth of the dough-receptacles, and to meet the requirements of any particular mass of dough, or even of different parts of the same mass, it may be necessary to adjust this position of the nut, which determines the depth of the dough-receptacle. In order to obtain this adjustment, I provide the shaft 60, which is operated by the hand-crank 61, and this shaft 60 carries at its middle portion the worm 62, which engages the spirally-geared exterior surface 63 of the nut 53, and the rotation of the shaft 60 in either direction, it will be evident, will advance or retract the nut 53 on the screw 54, so that at a moment's notice and while the machine is in operation the depth of the dough-receptacle can be varied to suit the requirements.

It is thought that the operation of the machine will be clear from the foregoing description. The batch of dough is placed in the hopper 8 and the machine set in operation. While the plunger 10 is in the advance position, the plate 15 prevents the dough from descending into the rectangular feeding-channel; but as the plunger is withdrawn a suction is created, which forces the dough down into the channel, even should it not descend by its own weight. The depth of the pockets in the measuring-cylinder having been adjusted by the hand-wheel 61, the plunger 10 feeds forward the dough into these pockets until the mass of dough is compressed sufficiently to stop the plunger, at which point the segment-rack 30 ceases to rock, and the movement is transferred to the segment-rack 29, raising the weight the necessary distance. The operating mechanism is so timed that the pin 37 on the gear 22 does not contact with the dog 36 for throwing in mesh the gear 34 until after the forward throw of the rock-lever 27. Then the gear 34 is thrown into mesh, the measuring-receptacle rotated, and the contact of the dog 51 with the plate 58 pushes the dough from the receptacles. The cylinder 11 being open on both sides and the plunger 44 also being open on the inner end, all scraps of dough that may accumulate readily drop out of the measuring-receptacle. Should there be any difference in consistency in the different portions of the batch of dough or in the different batches, the capacity of the dough-receptacles can be instantly changed to suit the requirements by turning the hand-crank 61 in either direction. It will also be noticed that the partitions 43 43 are arranged parallel and at right angles to the axis of the cylindrical measuring-receptacle, so that when the measuring-pockets have been filled and the receptacle rotated there is less likelihood of the dough being pulled out of the receptacle. If the pockets in the measuring-receptacle were shallow, there would be a tendency toward pulling the dough from the pockets by reason of its adhering to the mass of dough in the feeding-channel. Instead therefore of arranging for a very shallow receptacle when it is desired to divide into small portions I maintain the normal depth of the receptacle and subdivide the recess, and these partitions are so arranged that the initial pull on the dough as the measuring-receptacle starts shall be at one corner of the portions of dough instead of against an extended edge of the mass.

Having thus described my invention, what I claim as new, and desire to secure by Letters Patent, is—

1. In a dough-dividing machine, the combination, with a measuring-receptacle, a plunger to feed the dough to the receptacle, and a weight, of power-driven mechanism for actuating the plunger and for raising the weight, and a compensating gear interposed between the driving mechanism and the plunger, and the weight, whereby the pressure of the weight may be maintained uniform on the plunger during the full stroke of the driving mechanism.

2. In a dough-dividing machine, the combination, with a measuring-receptacle, a plunger to feed the dough to the receptacle, and a weight, of a power-driven rock-shaft with connecting mechanism for actuating the plunger and for raising the weight, and a compensating gear interposed between the rock-shaft and the plunger, and the weight, whereby the pressure of the weight may be maintained uniform on the plunger during the full stroke of the rock-shaft.

3. In a dough-dividing machine, the combination, with a measuring-receptacle, a plunger to feed the dough to the receptacle, and a weight, of a power-driven rock-shaft, with lever keyed thereto, and a compensating gear interposed between said lever and the plunger on the one part, and the weight on the other part, whereby the pressure of the weight may be maintained uniform on the plunger during the full stroke of the lever.

4. In a dough-dividing machine, the combination, with a measuring-receptacle, a plunger to feed the dough to the receptacle, and a weight, of a power-driven rock-shaft with lever keyed thereto, a pinion mounted on said lever, and a pair of gears meshing with said pinion, one of said gears connected with the weight, whereby the pressure of the weight may be maintained uniform on the plunger during the full stroke of the lever.

5. In a dough-dividing machine, the combination, with a hopper, a channel for receiving dough therefrom, a measuring-receptacle, and a reciprocating plunger for forcing the dough from said channel into the measuring-receptacle, of a power-driven rock-shaft, with a lever keyed thereto, a pinion mounted on said lever, and a pair of segment-gears loosely mounted on said rock-shaft on opposite sides of said pinion, and with which said pinion engages, a connecting-bar coupling one of said segment-gears to said plunger, and a weight coupled to the other of said segment-gears, whereby the pressure of the weight may be maintained uniform on the plunger during the full stroke of the lever.

6. In a dough-dividing machine, a measuring-receptacle, comprising a rotating cylinder provided with recesses, a plunger seated in said recess, movable radially to constitute the base of said recess, a nut adjustably mounted on the rotating cylinder to serve as a stop to limit the inward movement of the plunger, with means for adjusting said nut to limit the depth of the recess.

7. In a dough-dividing machine, a measuring-receptacle, comprising a rotating cylinder provided with recesses, a plunger seated in said recess, movable radially to constitute the base of said recess, a nut adjustably mounted on the rotating cylinder to serve as a stop to limit the inward movement of the plunger, said nut being provided with a spiral gear longitudinally, with a worm-gear to engage said spiral gear, and a hand-crank for rotating said worm, whereby the nut may be adjusted to limit the depth of the recess.

8. In a dough-dividing machine, a measuring-receptacle, comprising a rotating cylinder provided with recesses, a plunger seated in said recess, movable radially to constitute the base of said recess, a rack on said plunger with segment-gear engaging said rack, a dog secured to said segment-gear extending beyond the surface of the rotating cylinder, and a fixed stop on the frame with which said dog contacts to depress same and rock the segment-rack, whereby the plunger is advanced to force the dough from said recess.

9. In a dough-dividing machine, a measuring-receptacle, provided with a recess to receive the dough, and a movable partition-plate to divide said recess into compartments longitudinally, said partition being adapted to be pressed back out of the way by the dough when not in use.

10. In a dough-dividing machine, a measuring-receptacle, comprising a rotating cylinder provided with a recess to receive the dough, and a movable partition-plate to divide said recess into compartments longitudinally, said partition being adapted to be pressed back out of the way by the dough when not in use.

11. In a dough-dividing machine, a measuring-receptacle, comprising a rotating cylinder provided with a recess to receive the dough, a plunger seated in said recess movable radially to constitute the base of said recess, and a movable partition-plate to divide said recess into compartments longitudinally, said partition being adapted to be pressed back out of the way by the dough when not in use.

12. In a dough-dividing machine, a measuring-receptacle, comprising a rotating cylinder provided with a recess to receive the dough, a plunger seated in said recess, movable radially to constitute the base of said recess, said plunger-base being provided with slots, and movable partition-plates sliding in said slots, with lock for securing said plates in position to divide said recess into compartments longitudinally, said partition-plates being adapted to be pressed back out of the way by the dough when not in use.

PAUL S. WARD.

Witnesses:
R. O. HARGITT,
H. V. FETICK.